Oct. 6, 1970

C. A. HEATH ET AL 3,531,983

SONIC POLE TESTING APPARATUS

Filed Oct. 6, 1967

INVENTORS.
CHARLES A. HEATH
BY JACK HOLLAND

Donnelly, Mentag & Harrington

ATTORNEYS

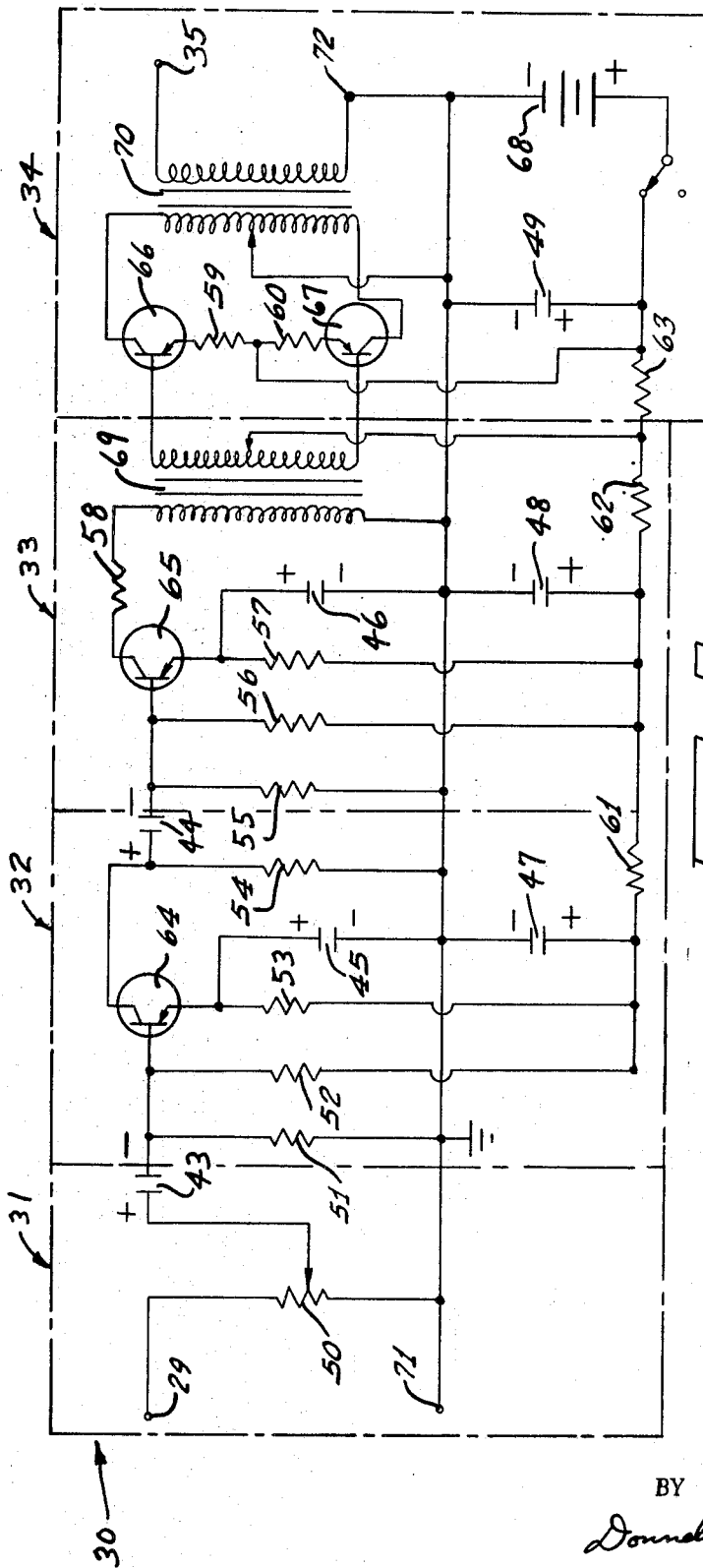

United States Patent Office 3,531,983
Patented Oct. 6, 1970

3,531,983
SONIC POLE TESTING APPARATUS
Charles A. Heath, Richmond, and Jack Holland, Lansing, Mich., assignors to Heath International, Inc., a corporation of Delaware
Filed Oct. 6, 1967, Ser. No. 673,476
Int. Cl. G01n 29/04
U.S. Cl. 73—67.2        5 Claims

ABSTRACT OF THE DISCLOSURE

A non-destructive sonic testing apparatus for determining the condition of an in-service wooden utility pole including means for generating sound energy by a shock against one side of an in-service utility pole, a sonic transducer positioned on the surface of the pole at a point opposite to the point of said shock for detecting the sound energy passing through the pole, a filter circuit having a high frequency network and a low frequency network coupled to the sonic transducer for dividing the sound energy impulses of the shock waves into a preselected range of high frequency energy pulses and a preselected range of low frequency energy pulses, an amplifier means coupled to each of said networks, and an output circuit including a meter coupled between said amplifier means for providing a meter reading of said energy pulses, with said meter being adapted to move in one direction to indicate good wood and in the opposite direction to indicate decayed wood, in accordance with the difference between the high frequency energy pulses and the low frequency energy pulses.

SUMMARY OF THE INVENTION

This invention relates to a non-destructive sonic testing apparatus for determining the presence of decay in wooden utility in-service poles, trees, wood posts and the like which have one end mounted rigidly in the ground.

The problems of electrical power interruptions or curtailment are of great concern to electrical power supply companies. Most of the electrical lines in use today are carried on wood utility poles, and the knowledge of the condition of these poles is of extreme importance to said companies. Heretofore, the principal methods of ascertaining information on the condition of utility poles have been by sight inspection, manual sounding, boring, and X-ray. The souding method of testing poles is inaccurate due to the variables in the human ear. The boring method of testing poles is destructive, and it has been found that it actually promotes decay. The X-ray method has proved to be an excellent and accurate method for testing utility poles. Experience has shown that a very high percentage of the poles tested by the X-ray method prove to be sound. However, a disadvantage of the X-ray method is that it is a costly method.

In view of the foregoing, it is an important object of the present invention to provide an apparatus for sonically testing wood utility poles and the like which overcomes the aforementioned disadvantages of the prior art utility pole testing methods and apparatus, and which may be used as a supplement to the X-ray method for evaluating in-service utility poles in a much more economical and accurate manner. The sonic testing apparatus of the present invention permits an efficient, low-cost, large-scale screening of in-service utility poles to determine which poles should be selected for testing by the X-ray method, and to limit the X-ray method only to those poles where decay or faults are present.

It is another object of the present invention to provide an apparatus for sonically testing wood utility poles and the like and which includes a means for generating sound energy by a shock against one side of an in-service utility pole and a sonic transducer positioned on the surface of the pole at a point opposite to the point of the shock for detecting the sound energy passing through the pole, a filter circuit having a high frequency network and a low frequency network coupled to the sonic transducer for dividing the sound energy impulses of the shock waves into a preselected range of high frequency energy pulses and a preselected range of low frequency energy pulses, an amplifier means coupled to each of said networks, and an output circuit including a meter coupled between said amplifier means for providing a meter reading of said energy pulses, with said meter being adapted to move in one direction to indicate good wood and in the opposite direction to indicate decayed wood, in accordance with the difference between the high frequency energy pulses and the low frequency energy pulses.

It is a further object of the present invention to provide a non-destructive sonic testing apparatus for determining the condition of an in-service wooden utility pole, and which includes a filter circuit having a high frequency network that includes a pair of condensers connected in series, and a low frequency network which includes an inductor means connected between said two condensers of said high frequency network and a condenser connected between the output end of said inductor means and ground.

It is still another object of the present invention to provide a non-destructive sonic testing apparatus for determining the condition of an in-service wooden utility pole which includes a filter circuit that divides out a range of low frequency energy pulse to indicate bad wood and which extends from about 160 cycles per second to about 600 cycles per second, and a range of high frequency energy pulses to indicate good wood and which extends from about 1,000 cycles per second to about 5,200 cycles per second.

Other features and advantages of this invention will be apparent from the following detailed description, appended claims, and the accompanying drawings.

In the drawings:

FIG. 2 is a circuit diagram of an amplifier circuit employed in the apparatus of FIG. 1;

FIG. 7 is a cross sectional sketch of an in-service utility pole, and illustrating the conduction of sonic energy through good wood portions of the pole and through decayed wood portions of the pole; and FIG. 8 is an elevational section sketch of a fragmentary portion of a utility pole structure, and illustrating that shock waves traveling transversely through a pole of good wood will contain most of their energy in high frequency waves.

Figure 1:
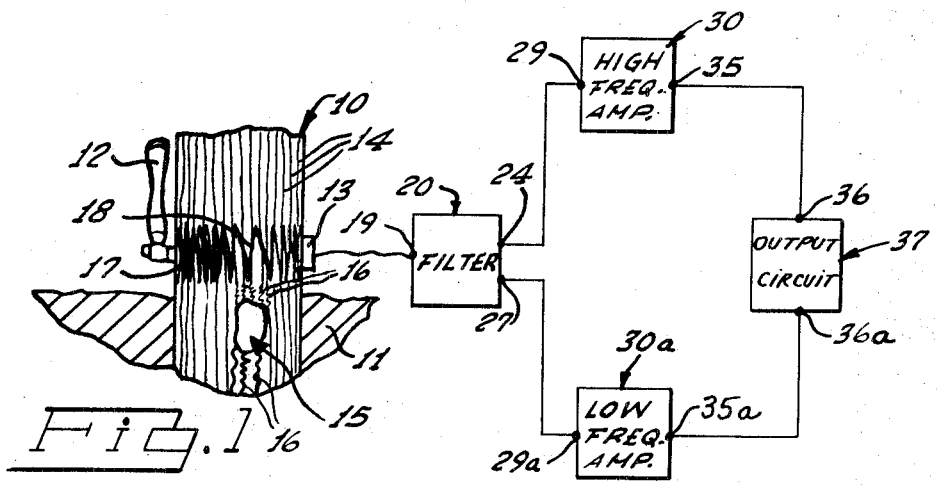
FIG. 1 is a block diagram of an illustrative sonic testing apparatus made in accordance with the principles of the present invention.

Referring now to the drawings and in particular to FIG. 1, the numeral 10 generally indicates a fragmentary portion of a conventional wooden utility pole which has the lower end thereof rigidly mounted in the ground 11. The numeral 12 designates a hammer which is used for manually shocking or providing an impact upon the utility pole 10 at a position adjacent the ground level. The numeral 13 designates a suitable sonic transducer which is positioned opposite to the point of impact of the shock created by the hammer 12. It will be understood that any other suitable means may be provided for shocking the pole 10.

As indicated in FIG. 1, the principal paths for the shock waves that are detected by the transducer 13 are transversely across the grain of the pole 10 and arcuately in parallel routes to the annular ring structure of the pole.

It will be understood that the utility pole 10 consists o fthe xylem cells of the tree from which it was formed, and that these cells are similar to a large bundle of long vertical fibers 14, as for example, the strings of a guitar or harp. The frequency with which these cell fibers 14 will conduct acoustical energy is dependent in part upon the rigidity of the fiber terminals.

As shown in FIG. 1, the illustrated pole 10 is decayed at the point indicated by the numeral 15. It will be seen that the decay 15 lessens the rigidity of the fibers 14 at the points indicated by the numeral 16. FIG. 8 illustrates a cross sectional sketch of a pole 10a which has no decay and in which the fibers 14a are held rigidly at the bottom ends thereof. When the pole 10a is shocked, the shock waves will contain most of their energy in high frequency waves, as indicated by the numeral 17.

The fibers 14 of the pole 10 of FIG. 1, which have their ends 16 of reduced rigidity, will conduct energy in low frequency waves 18 like a loosened string on a harp or guitar. In FIG. 7, which is a cross section through the structure of pole 10 of FIG. 1, the high frequency waves are indicated by the numeral 17 and the low frequency waves are indicated by the numeral 18. The apparatus of the present invention compares the energy carried in a preselected band of high frequency waves against the energy carried in a preselected band of low frequency waves and, accordingly, the presence of decay in a pole can be detected in a fast and economical manner.

Referring now to FIG. 1, wherein an illustrative embodiment of the apparatus is depicted in block form, the transducer 13 is shown as being connected to the input terminal 19 of a dividing filter circuit, generally indicated by the numeral 20. The transducer 13 converts the acoustical energy transmitted through the pole 10 into an electrical signal. A transducer 13 suitable for use in the apparatus of FIG. 1, is one available on the market from the Metrix Instrument Company of Houston, Tex., under the model name Metrix Series 500 Accelerometer.

Figure 3:
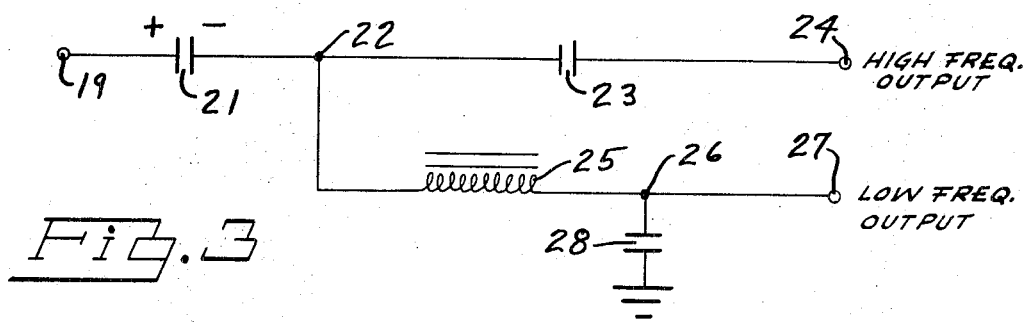
FIG. 3 is a circuit diagram of a filter circuit employed in the apparatus of FIG. 1.

The filter circuit 20 is shown in detail in FIG. 3 and it includes a first condenser 21 which has one plate connected to the filter input terminal 19, and the other plate connected to the junction terminal 22. The filter 20 includes a high frequency pass network and a low frequency pass network which function to separate the energy of the shock impulses into two frequency ranges. The high frequency pass network comprises a condenser 23 which has one plate connected to the junction terminal 22 and the other plate connected to an output terminal 24. The low frequency pass network includes an iron core inductor 25 which has its input end connected to the junction terminal 22 and its output end connected to the junction terminal 26. The junction terminal 26 is connected to a low frequency output terminal 27. The junction terminal 26 is coupled to ground by a condenser 28.

Figure 5:
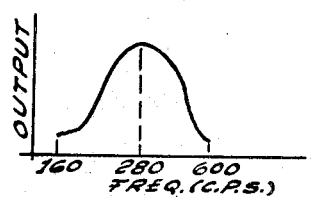
FIGS. 5 and 6 are schematic graphs showing the starting frequencies, the peak frequencies, and the cut-off frequencies of the high frequency pass network and low frequency pass network, respectively, of the filter circuit of FIG. 3.
Figure 6:
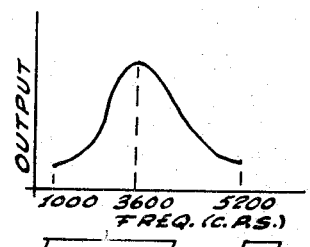

It has been found that two particular frequency ranges are most sensitive for determining the condition of an in-service wooden utility pole. As shown in FIG. 6, the optimum range of the high frequency pass network extends from a cut-in frequency of about 1,000 cycles per second to a cut-off frequency of about 5,200 cycles per second. This high frequency range has a peak of about 3,600 cycles per second. As shown in FIG. 5, the optimum low frequency range has been found to extend from about 160 cycles per second to about 600 cycles per second, with a peak of about 280 cycles per second.

As shown in FIG. 1, the output terminal 24 of the high frequency pass network of the filter 20 is connected to the input terminal 29 of a high frequency amplifier, generally indicated by the numeral 30. The output terminal 27 of the low frequency pass network of the filter 20 is connected to the input terminal 29a of a low frequency amplifier 30a. The amplifiers 30 and 30a are similar in structure and operation and, accordingly, only one of the amplifiers has been illustrated in detail in FIG. 2.

The amplifier 30 illustrated in FIG. 2 is illustrative of a suitable amplifier that may be used in amplifying the high frequency signals. The high frequency signal first passes through an attenuator stage generally indicated by the numeral 31, which is adapted to function as a gain control for the amplifier 30 and it enables the operator to accurately calibrate the response of the amplifier 30. The signal next passes through an amplifying stage or network generally indicated by the numeral 32, and thence into a driver stage generally indicated by the numeral 33. The amplifying stage 32 is capacitive coupled to the driver stage 33. The driver stage 33 is transformer coupled to a push-pull output network, generally indicated by the numeral 34, which also functions as a power amplifier. As shown in FIG. 1, the output signal from the amplifier 30 passes to an output terminal 35 which is connected to the input terminal 36 of an output circuit, generally indicated by the numeral 37. The output terminal of the low frequency amplifier 30a is indicated in FIG. 1 by the numeral 35a, and it is connected to a second input terminal 36a in the output circuit 37. The terminals 71 and 72 in the amplifier 30 of FIG. 2 are ground terminals.

Figure 4:
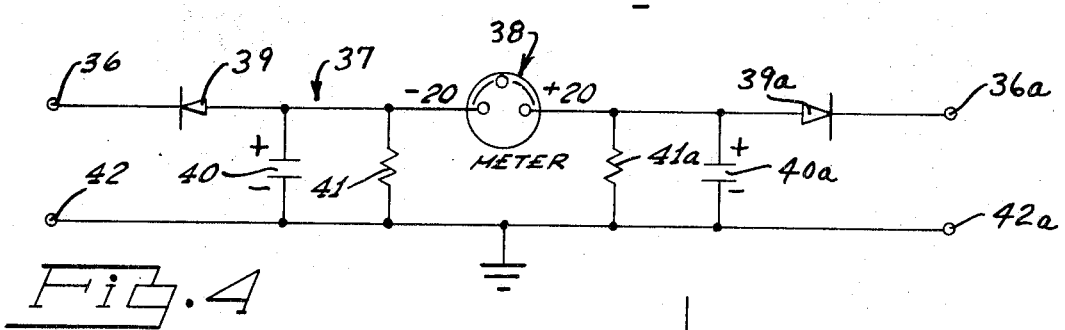
FIG. 4 is a circuit diagram of an output circuit employed in the apparatus of FIG. 1.

As shown in FIG. 4, the output signals from the high and low frequency amplifiers 30 and 30a pass into the output circuit 37 where they are respectively rectified and set in opposition to each other in a meter generally indicated by the numeral 38. The meter 38 may be any suitable meter which has a zero center and in which the meter needle can go either way, full scale to one side or the other of the zero position. A suitable meter is one which can measure a range of from minus 20 to a plus 20 microamps.

As shown in FIG. 4, the input terminal 36 of the output circuit 37 is connected to one side of the meter 38 through a diode 39. A condenser 40 and a resistor 41 are connected in parallel between the output side of the diode 39 and ground. The condenser 40 assists in providing a constant signal and the resistor 41 functions as a ground return path. As shown in FIG. 4, the other half of the output circuit 37 is similarly constructed, and the corresponding parts thereof are designated by the same reference numerals followed by the small letter a. The numerals 42 and 42a indicate ground terminals in FIG. 4.

The operation of the test apparatus of the present invention is adapted to be used to test an in-service wood utility pole in a minimum of time. The transducer 13 is held against the pole 10 to be tested and the hammer 12 is used to produce a shock impulse on the opposite side of the pole. Each impulse gives a reading on the meter 38. The transducer 13 preferably is moved to three locations, with more than one impact being provided at each location of the transducer. Each reading of the meter 38 gives an indication of the condition of the wood along the various wave propagation paths between the hammer 12 and the transducer 13. The apparatus of the present invention indicates the presence of decay in a wood utility pole and it also may indicate the size and location of such decay. The transducer 13 is placed near the ground line for optimum sensitivity, since in most cases decay appears at or below the ground line on a wood utility pole.

It will be seen that the output circuit 37 matches the low frequency input thereto against the high frequency input thereto. The two inputs are opposing so that the high frequency input drives the meter 38 in one direction and the low frequency input drives the meter 38 in the other direction. Thus, if at any time the opposing energy signals are equal, there will be no deflection on the meter 38. The meter 38 will move in a direction and magnitude in accordance with the larger of the two unequal opposing energy signals. The apparatus can be calibrated by the respective input attenuators of the amplifiers 30 and 30a so that in a 20-0-20 meter, a meter-reading of from plus 5 to plus 20 indicates a sound wood utility pole. A reading from minus 5 to minus 20 indicates the presence of considerable decay. The region near the center of the meter 38 from minus 5 to plus 5 indicates the presence of some decay in a wood pole. Since the tests are performed above ground, the visual observations of the position of the transducer 13 and the impact point of the hammer 12 provide the operator with a minimum of false evaluations due to continuities, shakes, shell rot or punky wood which would affect the intimate contact between the transducer 13 and the wooden pole 10. It should be understood that the energy waves travel transversely across the pole 10 by means of the fibrous cells of the wood and that these cells vibrate longitudinally in the pole.

Typical values of this illustrative embodiment:

| | |
|---|---|
| Condenser 21 | 5 microfarads. |
| Condenser 23 | .01 microfarad. |
| Condenser 28 | .1 microfarad. |
| Condensers 40, 40a | 40 microfarads. |
| Condensers 43, 45, 46, 47, 48, 49 | 50 microfarads. |
| Condenser 44 | 20 microfarads. |
| Resistors 41, 41a, 50, 52 | 10K ohms. |
| Resistor 51 | 150K ohms. |
| Resistor 53 | 470 ohms. |
| Resistors 54, 56 | 4.7K ohms. |
| Resistor 55 | 33K ohms. |
| Resistor 57 | 470 ohms. |
| Resistor 58 | 1.2K ohms. |
| Resistors 59, 60 | 8.2 ohms. |
| Resistor 61 | 1K ohms. |
| Resistor 62 | 220 ohms. |
| Resistor 63 | 47 ohms. |
| Inductor Coil 25 | 180 millihenries. |
| Diodes 39 | 1N 2482. |
| Transistors 64, 65 | SK 3004. |
| Transistors 66, 67 | 2N 188A. |
| Battery 68. | |
| Transformer 69 | Stancor TA-35. |
| Transformer 70 | Stancor TA-52. |

It will be seen that the deflection of the meter 38 indicates a shock energy distribution as a function of frequency of the acoustical energy transmitted through the pole 10. The terms "channel" and "network" are used synonymously herein.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What we claim is:

1. A non-destructive sonic testing apparatus for determining the condition of an in-service wood utility pole including:
    (a) means for generating sound energy by a shock against a side of an in-service utility pole at the ground level;
    (b) a sonic transducer positioned on the surface of the pole at a point opposite to the point where said shock is generated for detecting the sound energy passing through the pole;
    (c) a filter circuit for dividing the sound energy impulses of the shock wave into two preselected frequency range channels;
    (d) an amplifier means coupled to each of said frequency range channels;
    (e) a differential output circuit including a meter coupled between the output ends of said amplifier means for measuring the difference of the energy pulses in said channels;
    (f) said channels comprising a high frequency channel and a low frequency channel coupled to the sonic transducer for dividing the sound energy impulses of the shock waves into a preselected range of high frequency energy pulses and a preselected range of low frequency energy pulses;
    (g) said filter circuit high frequency channel including a pair of condensers connected in series; and
    (h) said filter circuit low frequency channel comprising an inductor means connected between said two condensers of said high frequency channel and a condenser connected between the output end of said inductor means and ground.

2. A non-destructive sonic testing apparatus as defined in claim 1, wherein:
    (a) said preselected range of low frequency energy pulses divided out by said filter circuit low frequency channel extends from about 160 cycles per second to about 600 cycles per second; and,
    (b) said preselected range of high frequency energy pulses divided out by said filter circuit high frequency channel extends from about 1,000 cycles per second to about 5,200 cycles per second.

3. A non-destructive sonic testing apparatus as defined in claim 1, wherein:
    (a) said output circuit meter is coupled between the output ends of said amplifier means for providing a visual meter reading of said energy pulses, with said meter being adapted to move in one direction to indicate good wood and in the opposite direction to indicate decayed wood, in accordance with the high frequency energy pulses and low frequency energy pulses, respectively.

4. A non-destructive sonic testing apparatus as defined in claim 1, wherein said output circuit includes:
    (a) a first diode coupled between one terminal of said meter and the output terminal of said high frequency channel, and a condenser and resistance means coupled in parallel between ground and said one meter terminal; and,
    (b) a second diode coupled between the other terminal of said meter and the output terminal of said low frequency channel, and a condenser and resistance means coupled in parallel between ground and said other meter terminal.

5. A non-destructive sonic testing apparatus as defined in claim 1, including:
    (a) means for adjusting the ratio of the high and low frequency channels relative to each other for calibrating the apparatus.

References Cited

UNITED STATES PATENTS

| | | | |
|---|---|---|---|
| 2,549,076 | 4/1951 | Gallagher et al. | 73—67 |
| 3,292,143 | 12/1966 | Russell | 340—15.5 |
| 3,345,861 | 10/1967 | Heath | 73—67.2 |
| 3,361,225 | 1/1968 | Nichols | 73—67 |
| 2,418,284 | 4/1947 | Winchel et al. | 324—140 XR |
| 2,946,217 | 7/1960 | Fruengel | 73—67.5 |

FOREIGN PATENTS

| | | |
|---|---|---|
| 156,338 | 3/1962 | U.S.S.R. |
| 1,297,213 | 5/1962 | France. |

JAMES J. GILL, Primary Examiner